United States Patent
Ha et al.

(10) Patent No.: US 8,369,234 B2
(45) Date of Patent: Feb. 5, 2013

(54) METHOD AND MOBILE TERMINAL FOR SEARCHING HOME NETWORK

(75) Inventors: Yong Min Ha, Gumi-si (KR); Na Young Kang, Gumi-si (KR); In Shik Kang, Gumi-si (KR); Sang Jae Bae, Gumi-si (KR); Jung Min Yoon, Gumi-si (KR); Won Ki Ha, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 12/466,127

(22) Filed: May 14, 2009

(65) Prior Publication Data

US 2010/0020725 A1 Jan. 28, 2010

(30) Foreign Application Priority Data

Jul. 23, 2008 (KR) ........................ 10-2008-0071785

(51) Int. Cl.
*G01R 31/08* (2006.01)

(52) U.S. Cl. ......... 370/252; 370/254; 455/433; 455/434

(58) Field of Classification Search ............... 370/252, 370/254, 338, 401; 455/418, 422.1, 432.1, 455/433, 434, 435.2
See application file for complete search history.

(56) References Cited

U.S. PATENT DOCUMENTS

| 5,794,146 | A | | 8/1998 | Sevcik et al. | |
|---|---|---|---|---|---|
| 5,839,069 | A | * | 11/1998 | Keshavachar et al. | ........ 455/437 |
| 2004/0152462 | A1 | * | 8/2004 | Hwang | ........ 455/432.1 |
| 2004/0253952 | A1 | * | 12/2004 | Rager et al. | ........ 455/432.1 |
| 2005/0037755 | A1 | * | 2/2005 | Hind et al. | ........ 455/435.3 |
| 2005/0107082 | A1 | * | 5/2005 | Gunaratnam et al. | ........ 455/434 |
| 2005/0221846 | A1 | * | 10/2005 | Jansen | ........ 455/502 |
| 2006/0062183 | A1 | | 3/2006 | Forte et al. | |
| 2006/0116104 | A1 | | 6/2006 | Yang | |
| 2006/0172737 | A1 | * | 8/2006 | Hind et al. | ........ 455/435.2 |
| 2010/0255837 | A1 | * | 10/2010 | Kuo et al. | ........ 455/433 |

FOREIGN PATENT DOCUMENTS

| GB | 2333208 A | 7/1999 |
|---|---|---|
| KR | 10-2005-0085570 A | 8/2005 |
| KR | 10-2007-0053888 A | 5/2007 |
| KR | 10-2008-0064020 A | 7/2008 |
| WO | 2004/054283 A2 | 6/2004 |
| WO | 2004/089015 A1 | 10/2004 |

* cited by examiner

*Primary Examiner* — Jung Park
(74) *Attorney, Agent, or Firm* — Jefferson IP Law, LLP (57) ABSTRACT

A mobile terminal and a method for searching for a home network for the mobile terminal are provided. The method includes performing a full scan for searching for the home network at a certain time after roaming to a visited network, initializing a count of a number of times a timer has expired when the home network is not found, initiating the timer, updating the count when the timer expires, scanning frequencies in a frequency list when the count is less than a certain value, and scanning all frequencies around the mobile terminal when the count is equal to the certain value.

19 Claims, 5 Drawing Sheets

METHOD AND MOBILE TERMINAL FOR SEARCHING HOME NETWORK

PRIORITY

This application claims the benefit under 35 U.S.C. §119(a) of a Korean patent application filed in the Korean Intellectual Property Office on Jul. 23, 2008 and assigned Serial No. 10-2008-0071785, the entire disclosure of which is hereby incorporated by reference.

BACKGROUND OF THE INVENTION

1. Field of the Invention

The present invention relates to a method and mobile terminal for searching for a home network. More particularly, the present invention relates to a method for a mobile terminal roamed to a Visited Public Land Mobile Network (VPLMN) to search for the Home Public Land Mobile Network (HPLMN) quickly and efficiently without a large increase of energy consumption.

2. Description of the Related Art

With advancements of mobile technology and increased mobility, mobile network operators are offering roaming services to other mobile networks for the benefit of their subscribers. A roaming service is a service that enables a subscriber who is away from a home network to continuously initiate and receive a call through another carrier's network.

According to 3rd Generation Partnership Project (3GPP) specifications, a mobile terminal in a Visited Public Land Mobile Network (VPLMN) performs a full scan to search periodically for its Home Public Land Mobile Network (HPLMN). The full scan cycle can be set in a range of 6 minutes to 8 hours in 6 minute steps. When no search period is set, the HPLMN search is performed using a default value of 30 minutes stored in a Subscriber Identity Module (SIM) card. The HPLMN search is repeated periodically until the mobile terminal camps on the HPLMN.

In a conventional HPLMN search method, the mobile terminal maintains its connection with the serving VPLMN, even when the mobile terminal has already moved to the HPLMN, until a timer for HPLMN searching has expired. Accordingly, an unnecessary roaming service expense may be imposed on the home network operator and subscriber. In order to avoid the unnecessary expense, the timer may be set to a short timeout value. In this case, however, the network search is performed more frequently, resulting in an increase of power consumption of the mobile terminal.

Therefore, a need exists for a method and mobile terminal that searches for a home network quickly and efficiently without compromising power consumption.

SUMMARY OF THE INVENTION

An aspect of the present invention is to address at least the above-mentioned problems and/or disadvantages and to provide at least the advantages described below. Accordingly, an aspect of the present invention is to provide a method and mobile terminal that is capable of searching for a home network quickly and efficiently without compromising power consumption of the mobile terminal.

In accordance with an aspect of the present invention, a method for searching for a home network for a mobile terminal is provided. The method includes performing a full scan for searching for the home network at a certain time after roaming to a visited network, initializing a count of a number of times a timer has expired when the home network is not found, initiating the timer, updating the count when the timer expires, scanning frequencies in a frequency list when the count is less than a certain value, and scanning all frequencies around the mobile terminal when the count is equal to the certain value.

In accordance with another aspect of the present invention, a method for searching for a home network for a mobile terminal is provided. The method includes performing a full scan for searching for the home network at a certain time after roaming to a visited network, initiating a first timer set to a first search interval and a second timer set to a second search interval when the home network is not found, scanning frequencies in a frequency list when the first timer expires, and scanning all frequencies around the mobile terminal when the second timer expires.

In accordance with still another aspect of the present invention, a mobile terminal is provided. The terminal includes a radio frequency unit for establishing a communication channel, a timer for defining an interval for scanning frequencies in a frequency list, a control unit for performing a full scan for searching for a home network at a certain time after roaming to a visited network, for initializing a count of a number of times a timer has expired when the home network is not found, for initiating the timer, for updating the count when the timer expires, for scanning frequencies in the frequency list when the count is less than a certain value, and for scanning all frequencies around the mobile terminal when the count is equal to the certain value, and a buffer for storing the updated count.

In accordance with a further aspect of the present invention, a mobile terminal is provided. The terminal includes a radio frequency unit for establishing a communication channel, a first timer set to a first search interval, a second timer set to a second search interval, and a control unit for performing a full scan at a certain time after roaming to a visited network, for initiating the first timer and the second timer when the home network is not found, for scanning frequencies in a frequency list when the first timer expires, and for scanning all frequencies around the mobile terminal when the second timer expires.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalent.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention include a mobile terminal that may be any one of a Global System for Mobile (GSM) Communication terminal, a Universal Mobile Telecommunications System (UMTS) terminal, a Time Division Multiple Access (TDMA) terminal, a Code Division Multiple Access (CDMA) terminal, a Wideband CDMA (WCDMA) terminal and the like that supports a roaming service.

In the exemplary embodiments of the present invention, a home network is a Home Public Land Mobile Network (HPLMN) to which an owner of the terminal has subscribed, and a visited network is a Visited Public Land Mobile Network (VPLMN) in which a subscriber has roamed when leaving the HPLMN.

Figure 1:
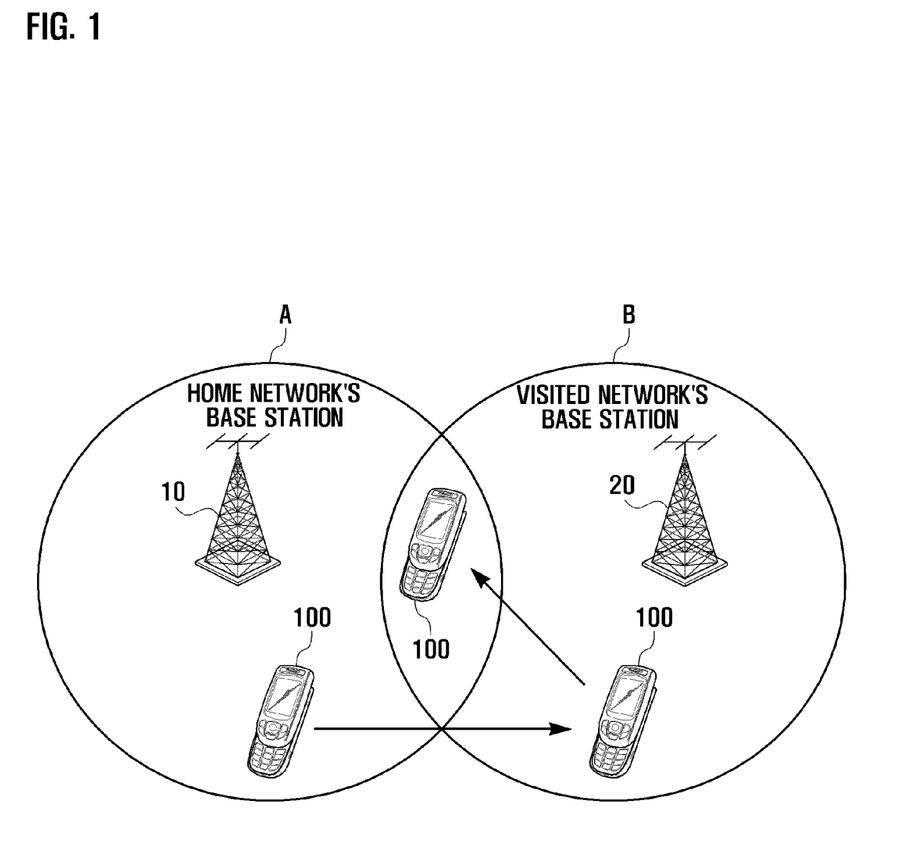
FIG. 1 is a schematic diagram illustrating a mobile terminal roaming between a home network and a visited network according to an exemplary embodiment of the present invention.

FIG. 1 is a schematic diagram illustrating a mobile terminal roaming between a home network and a visited network according to an exemplary embodiment of the present invention.

Referring to FIG. 1, the mobile terminal 100 moves out of service area A of the home network 10 (hereinafter called interchangeably "home base station") into service area B of the visited network 20 (hereinafter called interchangeably "visited base station") to roam to the visited base station 20.

After successfully roaming to the visited base station 20, the mobile terminal 100 searches for the home base station 10 periodically. If the mobile terminal 100 moves back into the service area A of the home base station 10, the mobile terminal 100 attempts to camp on the home base station 10. More specifically, the mobile terminal 100 has two search intervals for searching for the home network such that the mobile terminal 100 performs a first scan of frequency bands listed on a frequency list upon expiration of a first search interval and a second scan of all frequency bands upon the expiration of a second search interval. The frequency list may be an Acquisition DataBase (ACQ DB) stored in the mobile terminal 100 or a Higher Priority PLMN List stored in a Subscriber Identity Module (SIM) card. For convenience, the roaming procedure is described with the ACQ DB.

The mobile terminal 100 first scans preferred frequency bands on the frequency list upon expiration of the first search interval and then scans all the frequency bands upon expiration of the second search interval for searching for the home network quickly and efficiently. The first search interval and the second search interval are described in more detail below.

An exemplary roaming scenario of a mobile terminal is described above. An exemplary internal structure of a mobile terminal is described in detail below.

Figure 2A:
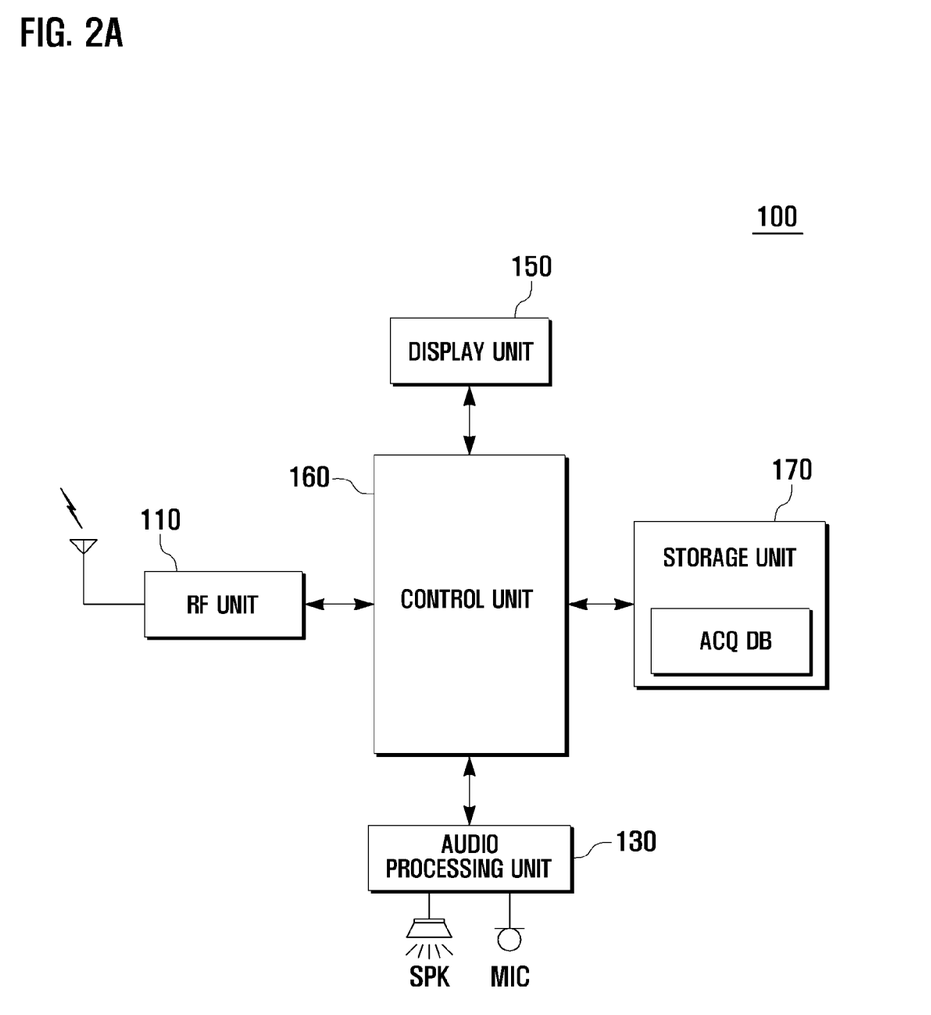
FIG. 2A is a block diagram illustrating a configuration of a mobile terminal according to an exemplary embodiment of the present invention.

FIG. 2A is a block diagram illustrating a configuration of a mobile terminal according to an exemplary embodiment of the present invention.

Figure 2B:
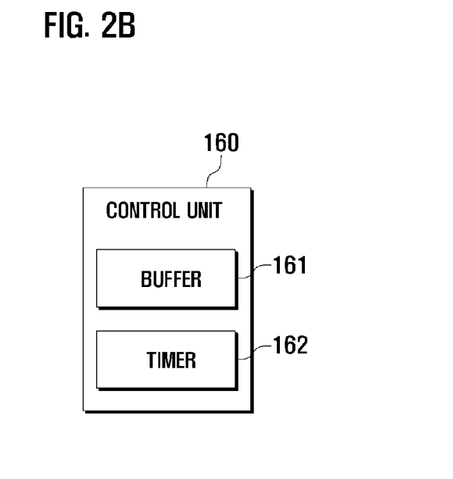
FIG. 2B is a block diagram illustrating a configuration of a control unit of a mobile terminal implemented with a single timer according to an exemplary embodiment of the present invention.
Figure 2C:
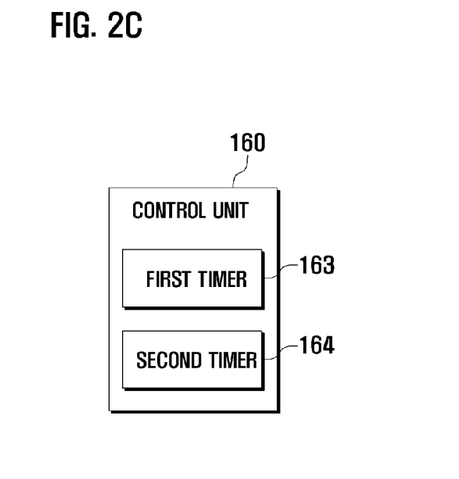
FIG. 2C is a block diagram illustrating a configuration of a control unit of a mobile terminal implemented with two timers according to an exemplary embodiment of the present invention.

FIG. 2B is a block diagram illustrating a configuration of a control unit of a mobile terminal which is implemented with a single timer according to an exemplary embodiment of the present invention. FIG. 2C is a block diagram illustrating a configuration of the control unit of a mobile terminal which is implemented with two timers according to an exemplary embodiment of the present invention.

Referring to FIG. 2A, the mobile terminal 100 includes a Radio Frequency (RF) unit 110, an audio processing unit 130, a display unit 150, a storage unit 170 and a control unit 160.

The RF unit 110 establishes a communication link with a base station for voice and data communication under control of the control unit 160. The RF unit 110 may be configured to determine frequencies around the mobile terminal 100 and provide detailed information on the determined frequencies under the control of the control unit 160. More specifically, when the mobile terminal is activated and enters into a shadow area or moves out of the shadow area, the mobile terminal 100 performs a raw scan to detect the frequency bands of the base stations around it. From the raw scan, rough information related to the frequencies is acquired. Next, the mobile terminal performs a fine scan for finding center frequencies of the frequency bands. Here, the mobile terminal may store or update the information on the currently associated base station within the storage unit 170 in the form of the ACQ DB. More particularly, the RF unit 110 may be configured to scan the frequencies of the list when the mobile terminal 100 is roamed to a visited network. The RF unit 110 also performs a full scan whenever the second search interval has expired under the control of the control unit 160.

The audio processing unit 130 processes audio data input through the control unit 160 to be output through a Speaker (SPK) in the form of an audible sound wave. The audio processing unit 130 also processes an audio signal input through a Microphone (MIC) to output to the control unit 160 in the form of audio data. More particularly, the audio processing unit 130 may be configured to output an alert sound that gives notice of a connection to the visited network and the home network through the Speaker (SPK).

The display unit 150 displays various menu screen images, data input by a user and information related to settings and an operation status of the mobile terminal 100. The display unit 150 may be implemented with a Liquid Crystal Display (LCD) panel. If the display unit 150 is implemented with a touchscreen-enabled LCD panel, the display unit 150 may function as an input unit. The display unit 150 may be configured to display a communication channel establishment process of the RF unit 100 that is in progress. In more detail, the display unit 150 displays a series of an initial screen with the activation of the mobile terminal, a manual or an automatic frequency search process that is in progress and a search result. The search result may be displayed with an alert message indicating failure or success of the frequency search. The display unit 150 may be configured to display information related to a currently registered PLMN.

The storage unit 170 stores application programs for managing functions associated with a network search function of the mobile terminal 100, user data created by the user, communication data and the like. The storage unit 170 may be configured to provide at least one buffer for buffering data generated while the application programs are running. More particularly, the storage unit 170 stores the ACQ DB, and provides and updates the information of the ACQ DB. Although not illustrated, the storage unit 170 may be divided into a program region and a data region. The program region stores an Operating System (OS) and application programs, and the data region stores the user data, application data related to the operation of the application programs, ACQ DB, and the first search interval and the second search interval.

The ACQ DB may include records of base stations, each including a frequency number, a PLMN ID, a Cell ID and other information fields. The frequency number indicates a frequency band on which the mobile station establishes a communication channel with a corresponding base station. Also, the frequency number may be a center frequency of a currently associated base station. That is, the ACQ DB lists records of the base stations including their frequency numbers and PLMN IDs obtained during the network search procedure. The records of the base stations may be sorted in ascending or descending order of a connection log. The ACQ DB performs the home network search upon expiration of the first search interval while the mobile terminal 100 is roamed to the visited network. The ACQ DB update may be performed with maintenance of the home network frequency information.

The first search interval is a periodic interval for initiating a frequency scan on a previously stored frequency list, and the second search interval is a periodic interval for initiating the full scan of all the frequencies. The search intervals may be values for a home network search that are conventionally stored in the SIM card. The first search interval may be set to 1/N, where N is a value of the second search interval and is a natural number.

The control unit 160 controls operations of the mobile terminal and signaling among internal function blocks. The control unit 160 may incorporate a data processing function for processing the data to be transmitted and received through the RF unit 110. Also, the control unit 160 processes the voice signal input through the audio processing unit 130, alphanumeric data input by the user and data input through the RF unit 110.

More particularly, the control unit 160 controls such that the mobile terminal roamed to the visited network performs the home network search by scanning the frequencies provided by the ACQ DB upon expiration of the first search interval and by scanning all the frequencies upon expiration of the second search interval. The two search intervals may be implemented with a single timer or two timers.

Referring to FIG. 2B, the control unit 160 includes a timer 162 and a buffer 161.

The timer 162 is set to a timeout value of the first search interval. When the timer 162 has expired, the control unit 160 scans the frequencies of the ACQ DB.

The buffer 161 may store the number of times the timer 162 has expired, accumulatively. When the number of expirations of the timer 162 is equal to N, the control unit 160 performs the full scan. For example, assuming that the first search interval and the second search interval are set to 2 minutes and 30 minutes, respectively, the control unit 160 increments the number of expirations by 1 whenever the first search interval has expired, stores the number of expirations in the buffer 161 and performs the full scan when the number of expirations is equal to 15, i.e. the second search interval has expired.

Referring to FIG. 2C, the control unit 160 includes a first timer 163 set to a timeout value of the first search interval and a second timer 164 set to a timeout value of the second search interval. The control unit 160 scans the frequencies of the ACQ DB when the first timer 163 has expired and scans all frequencies around it when the second timer 164 has expired.

Accordingly, the mobile terminal 100 that roamed to the visited network performs the home network search with two different search intervals (i.e., the first search interval and the second search interval). Since the home network search is performed with the first search interval set to a short timeout value on a small number of frequencies provided by the ACQ DB and the second search interval set to a relatively long timeout value for the full scan, the home network may be found quickly and efficiently without a large increase of power consumption.

Although not illustrated in FIG. 2A, the mobile terminal 100 may further include other supplementary function blocks, such as a camera, a multimedia module, a battery charging interface module, an external device connection interface module, and the like.

Exemplary structures of the internal function blocks of the mobile terminal and their operations are described above. Hereinafter, an exemplary home network search method of a mobile terminal is described.

Figure 3:
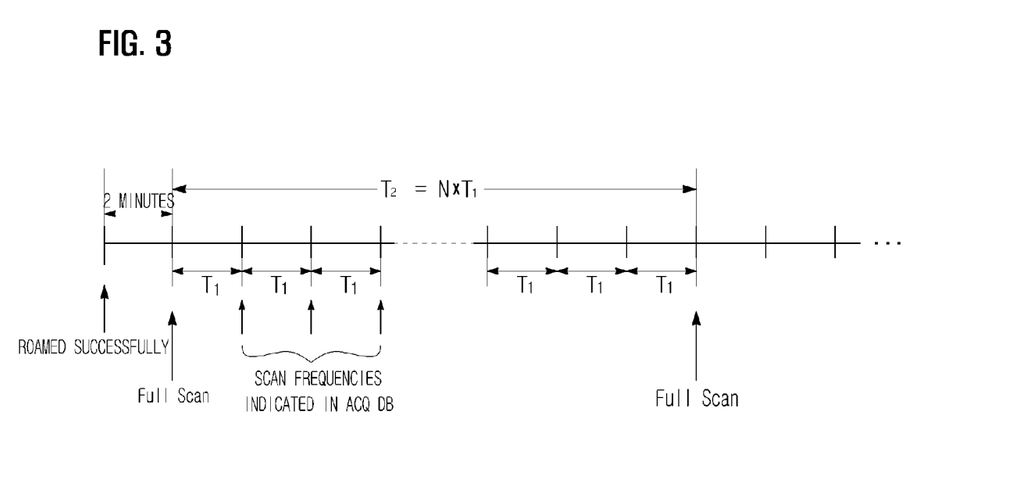
FIG. 3 is a timing diagram for a home network search according to an exemplary embodiment of the present invention.

FIG. 3 is a timing diagram for a home network search according to an exemplary embodiment of the present invention.

Referring to FIGS. 2A to 2C and 3, the home network search is performed with the first search interval ($T_1$) and the second search interval ($T_2$). In an exemplary implementation, the second search interval ($T_2$) is N multiples of the first search interval ($T_1$), where N is a natural number.

The mobile terminal 100 performs a full scan for searching for the home network after a certain time, e.g. 2 minutes, from the time at which the mobile terminal 100 has roamed to a visited network according to the 3rd Generation Partnership Project (3GPP) specification. The control unit 160 of the mobile terminal 100 initiates the timer 162 with the start of the full scan and scans frequencies registered with the ACQ DB whenever the first search interval ($T_1$) has expired and the second search interval ($T_2$) has expired, i.e. when Nth first search interval ($T_1$) has expired. The home network search continues until the mobile terminal 100 camps on the home network.

Figure 4:
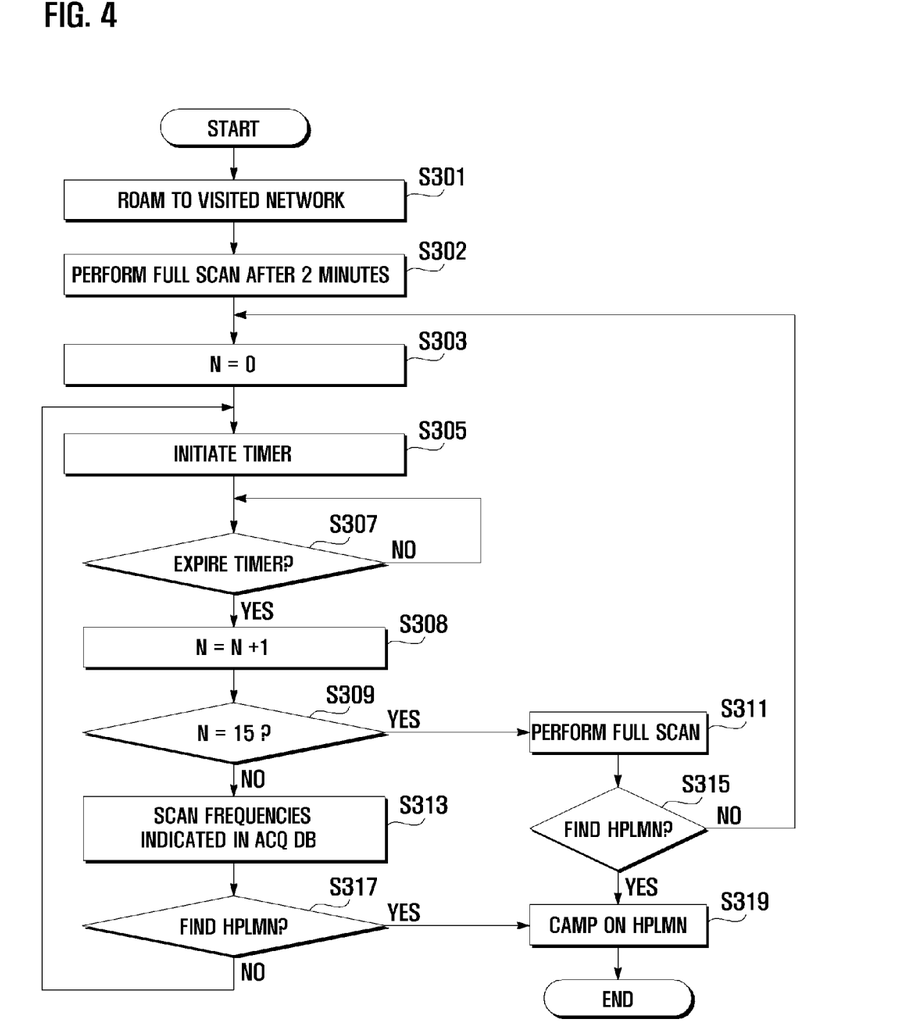
FIG. 4 is a flowchart illustrating a home network search method according to an exemplary embodiment of the present invention.

FIG. 4 is a flowchart illustrating a home network search method according to an exemplary embodiment of the present invention.

FIG. 4 is illustrated under the assumption that the first search interval and the second search interval are 2 and 30 minutes, respectively. However, the timeout values of the first search interval and the second search interval are not limited thereto. For example, the first search interval and the second search interval may be set to specific values depending on a system design or a mobile network operator.

Referring to FIGS. 1, 2A, 2B, 3 and 4, the mobile terminal 100 moves out of its home network and roams to a visited network successfully in step S301. After roaming to the visited network, the mobile terminal 100 waits for 2 minutes and then performs the full scan for the home network search according to the 3GPP specification in step S302. Sequentially, the control unit 160 of the mobile terminal 100 initializes a count value N to 0 in step S303, where N is a natural number indicating a number of expirations of the first search interval. When the first search interval is set to 2 minutes, the count value N increments by 1 every 2 minutes. When the second search interval is set to 30 minutes, the count value N reaches 15 and the control unit 160 determines that the second search interval has expired.

After initializing the count value N, the control unit 160 starts the timer 162 in step S305. The timer 162 is set to a timeout value of 2 minutes. The control unit 160 monitors the timer 162 to determine whether the timer 162 has expired in step S307. If the timer 162 has expired, the control unit 160 increments the count value N by 1 in step S308. Otherwise, the control unit 160 continues to monitor the timer 162. At this time, the updated count value N is stored in the buffer 161. Next, the control unit 160 determines whether the count value is equal to 15 in step S309. If the count value N is not equal to 15, the control unit 160 determines the expiration of the first search interval and scans the frequencies listed in the ACQ DB in step S313. However, the frequency scanning is not limited to the frequencies of the ACQ DB. For example, the frequency scanning may be performed to frequencies listed in the Higher Priority PLMN list.

After scanning the frequencies of the ACQ DB in step S313, the control unit 160 determines whether the home network, i.e. HPLMN, is found as a result of the frequency scanning in step S317. If the HPLMN is found as the result of the frequency scanning, the control unit 160 controls such that the mobile terminal 100 camps on the home network in step S319. Otherwise, the control unit 160 proceeds to step S305 to initialize and restart the timer 162.

If the count value N is equal to 15 at step S309, the control unit 160 detects the expiration of the second search interval and performs the full scan in step S311. The control unit 160 determines whether the home network, i.e. HPLMN, is found as a result of the frequency scanning in step S315. If the HPLMN is found, the control unit 160 controls such that the mobile terminal 100 camps on the home network in step S319. Otherwise, the control unit 160 proceeds to step S303.

An exemplary home network search method using a single timer has been described above. An exemplary home network search method using two timers is described below.

Figure 5:
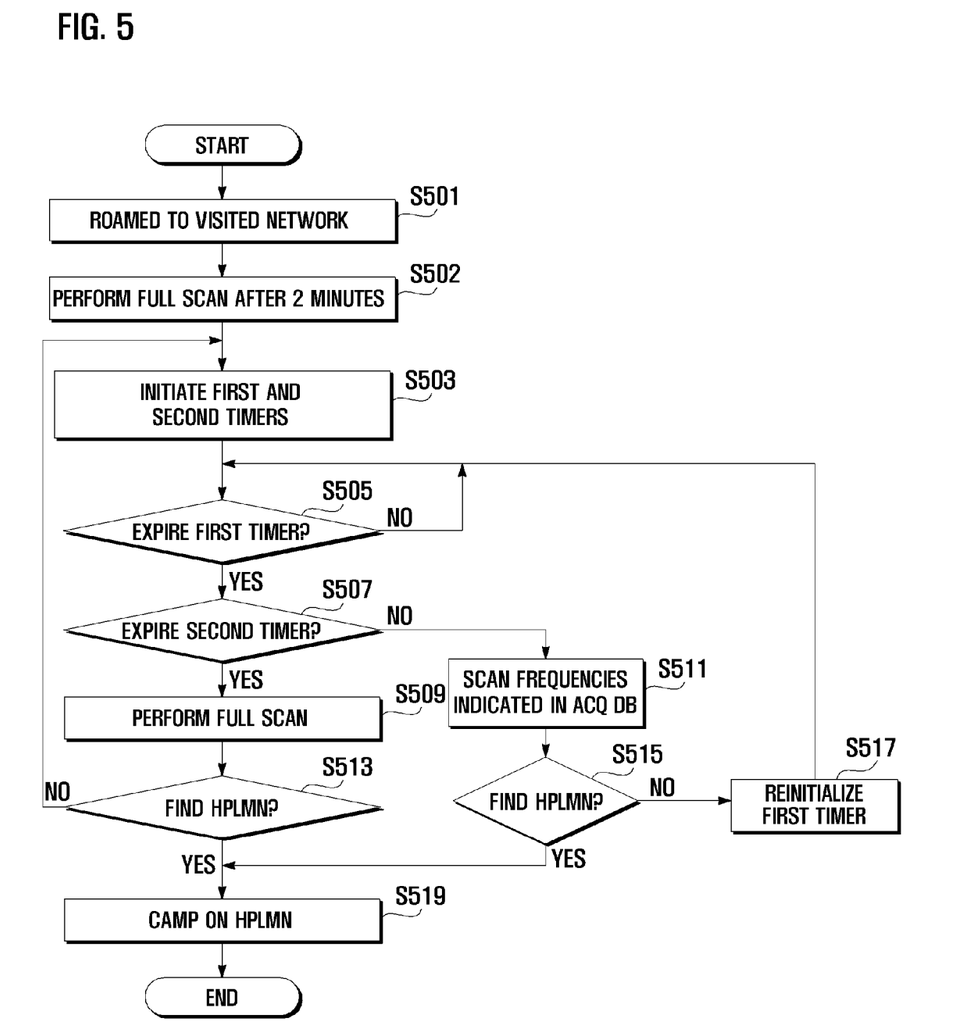
FIG. 5 is a flowchart illustrating a home network search method according to an exemplary embodiment of the present invention.

FIG. 5 is a flowchart illustrating a home network search method according to an exemplary embodiment of the present invention.

Referring to FIGS. 1, 2A, 2C and 5, the mobile terminal 100 moves out of its home network and roams to a visited network successfully in step S501. After roaming to the visited network, the mobile terminal 100 waits 2 minutes and then performs a full scan for the home network search according to the 3GPP specification in step S502. The control unit 160 of the mobile terminal 100 initiates the first timer 163 and the second timer 164 in step S503.

The control unit 160 monitors the first timer 163 and the second timer 164 to determine whether the first timer 163 has expired in step S505. If the first timer 163 has expired, the control unit 160 determines whether the second timer 164 has expired in step S507. Otherwise, the control unit 160 continues to monitor the first timer 163 and the second timer 164. If the second timer has not expired, the control unit 160 scans the frequencies listed in the ACQ DB in step S511. The control unit 160 determines whether the home network, i.e. HPLMN is found as the result of the frequency scanning in step S515. If the HPLMN is found, the control unit 160 controls such that the mobile terminal 100 camps on the HPLMN in step S519. Otherwise, the control unit 160 resets the first timer 163 in step S517 and proceeds to step S505.

If the second timer has expired in step S507, the control unit 160 performs the full scan, i.e. scans all frequencies around the mobile terminal 100 in step S509. The control unit 160 determines whether the home network, i.e. HPLMN, is found as the result of the full scan in step S513. If the home network is found, the control unit 160 controls such that the mobile terminal 100 camps on the home network. Otherwise, the control unit 160 proceeds to step S503 to initialize the first timer 163 and the second timer 164.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for searching for a home network for a mobile terminal, the method comprising:
    performing a full scan for searching for the home network at a certain time after roaming to a visited network;
    initializing a count of a number of times a timer has expired when the home network is not found;
    initiating the timer;
    updating the count when the timer expires;
    scanning frequencies included in a frequency list comprising at least one of an Acquisition Database list previously stored in a storage unit of the mobile terminal and a Higher Priority Public Land Mobile Network list previously stored in a Subscriber Identity Module (SIM) card when the count is less than a certain value; and
    scanning all frequencies around the mobile terminal when the count is equal to the certain value.

2. The method of claim 1, wherein the scanning of the frequencies included in the frequency list comprises:
    camping on the home network when the home network is found; and
    reinitiating the timer when the home network is not found.

3. The method of claim 1, wherein the scanning of all the frequencies around the mobile terminal comprises:
    camping on the home network when the home network is found; and
    initializing the count when the home network is not found.

4. The method of claim 1, wherein the Acquisition Database stores information related to Public Land Mobile Networks and frequencies of the Public Land Mobile Networks.

5. The method of claim 1, wherein the updated count is stored in a buffer.

6. A method for searching for a home network for a mobile terminal, the method comprising:
    performing a full scan for searching for the home network at a certain time after roaming to a visited network;
    initiating a first timer set to a first search interval and a second timer set to a second search interval when the home network is not found;
    scanning frequencies included in a frequency list comprising at least one of an Acquisition Database list previously stored in a storage unit of the mobile terminal and a Higher Priority Public Land Mobile Network list previously stored in a Subscriber Identity Module (SIM) card when the first timer expires; and scanning all frequencies around the mobile terminal when the second timer expires.

7. The method of claim 6, wherein the scanning of the frequencies included in the frequency list comprises:

camping on the home network when the home network is found; and reinitiating the first timer when the home network is not found.

8. The method of claim 6, wherein the scanning of all the frequencies around the mobile terminal comprises:

camping on the home network when the home network is found; and reinitiating the first timer and the second timer when the home network is not found.

9. The method of claim 6, wherein the Acquisition Database stores information related to Public Land Mobile Networks and frequencies of the Public Land Mobile Networks.

10. The method of claim 6, wherein the second search interval is N multiples of the first search interval, wherein N is a natural number.

11. A mobile terminal comprising:

a radio frequency unit for establishing a communication channel;

a timer for defining an interval for scanning frequencies included in a frequency list comprising at least one of an Acquisition Database list previously stored in a storage unit of the mobile terminal and a Higher Priority Public Land Mobile Network list previously stored in a Subscriber Identity Module (SIM) card;

a control unit for performing a full scan for searching for a home network at a certain time after roaming to a visited network, for initializing a count of a number of times a timer has expired when the home network is not found, for initiating the timer, for updating the count when the timer expires, for scanning frequencies included in the frequency list when the count is less than a certain value, and for scanning all frequencies around the mobile terminal when the count is equal to the certain value; and a buffer for storing the updated count.

12. The terminal of claim 11, wherein the control unit controls camping on the home network when the home network is found as a result of the frequencies scanned in the frequency list and reinitiating the timer when the home network is not found as a result of the frequencies scanned in the frequency list.

13. The terminal of claim 11, wherein the control unit controls camping on the home network when the home network is found as a result of all the frequencies scanned around the mobile terminal and initializing the buffer when the home network is not found as a result of all the frequencies scanned around the mobile terminal.

14. The terminal of claim 11, wherein the Acquisition Database stores information related to Public Land Mobile Networks and frequencies of the Public Land Mobile Networks.

15. A mobile terminal comprising:

a radio frequency unit for establishing a communication channel;

a first timer set to a first search interval;

a second timer set to a second search interval; and a control unit for performing a full scan at a certain time after roaming to a visited network, for initiating the first timer and the second timer when the home network is not found, for scanning frequencies included in a frequency list comprising at least one of an Acquisition Database list previously stored in a storage unit of the mobile terminal and a Higher Priority Public Land Mobile Network list previously stored in a Subscriber Identity Module (SIM) card when the first timer expires, and for scanning all frequencies around the mobile terminal when the second timer expires.

16. The terminal of claim 15, wherein the control unit controls camping on the home network when the home network is found as a result of the frequencies scanned in the frequency list and reinitiating the first timer when the home network is not found as a result of the frequencies scanned in the frequency list.

17. The terminal of claim 15, wherein the control unit controls camping on the home network when the home network is found as a result of all the frequencies scanned around the mobile terminal and reinitiating the first timer and the second timer when the home network is not found as a result of all the frequencies scanned around the mobile terminal.

18. The mobile terminal of claim 15, wherein the Acquisition Database stores information on Public Land Mobile Networks and frequencies of the Public Land Mobile Networks.

19. The terminal of claim 15, wherein the second search interval is N multiples of the first search interval, wherein N is a natural number.

* * * * *